United States Patent [19]

Johnston

[11] 4,424,962

[45] Jan. 10, 1984

[54] SPHERICAL SPRING MOUNTING

[76] Inventor: Malcolm Johnston, 46 Ladbroke Square, London W11, 3ND, England

[21] Appl. No.: 319,851

[22] Filed: Nov. 9, 1981

[30] Foreign Application Priority Data

Oct. 24, 1980 [GB] United Kingdom ................. 8034357

[51] Int. Cl.³ ............................................. F16F 1/38
[52] U.S. Cl. ................. 267/140.2; 267/141.1
[58] Field of Search .................. 248/561, 576, 577; 267/140, 140.2, 140.3, 140.4, 141.1–141.5

[56] References Cited

U.S. PATENT DOCUMENTS 2,117,264  5/1938  Workman .................... 267/141.1
3,467,353  9/1969  Peterson et al. ............. 267/141.1

Primary Examiner—Duane A. Reger
Attorney, Agent, or Firm—James Creighton Wray

[57] ABSTRACT

A spherical spring mounting is described comprising a central hub with a part-spherical outer surface around which are arranged truncated spherical shells separated by and bonded to elastomer layers. Means are provided for connecting the hub with a selected shell at different positions around the hub axis so that a selected degree of resilience can be provided to a member mounted to extend along the hub axis. The spring mounting may be used e.g. in a standing frame for a handicapped person.

7 Claims, 6 Drawing Figures

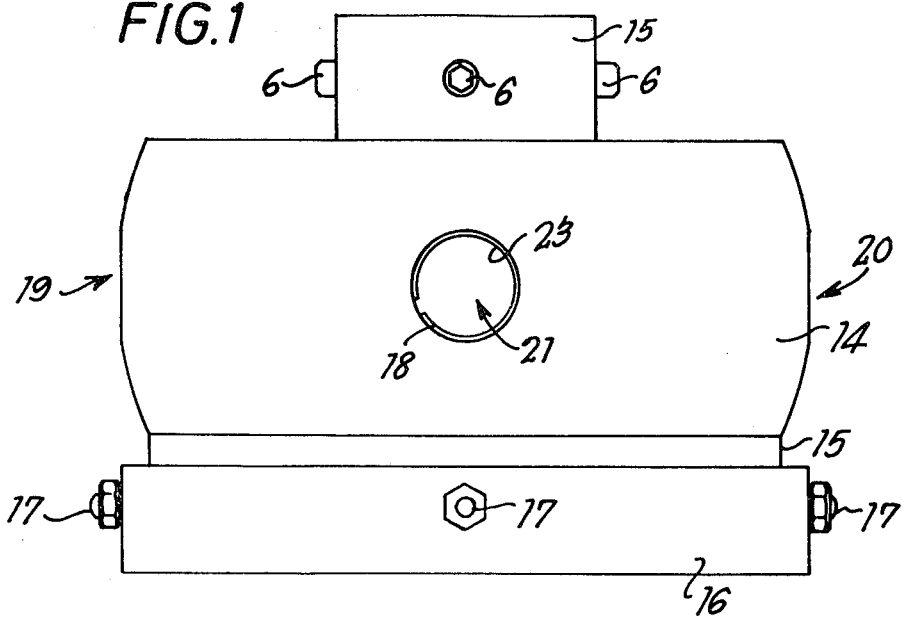
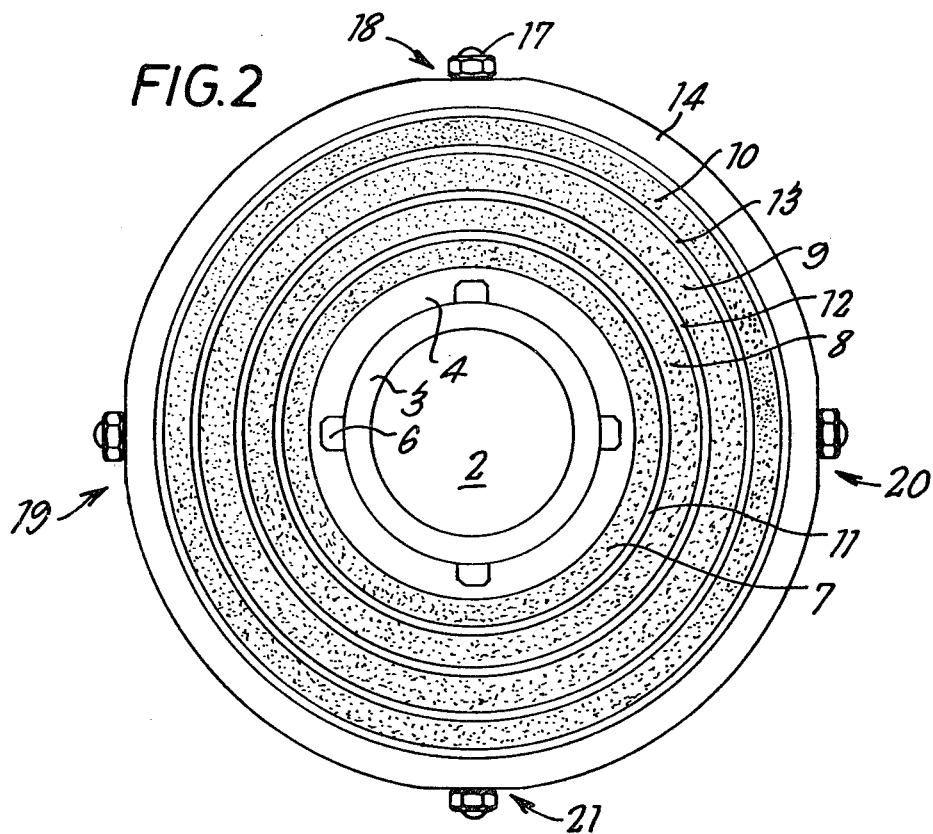

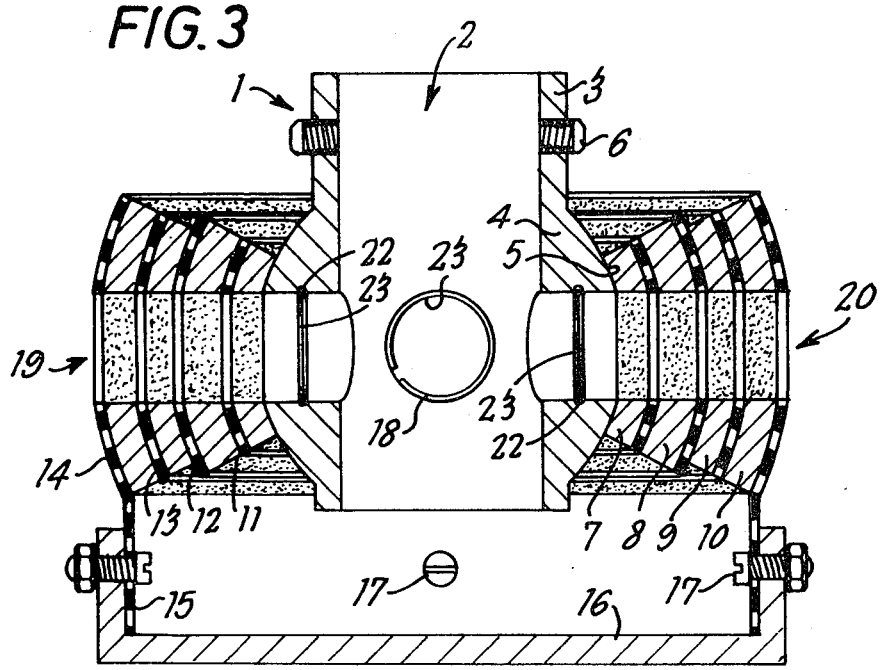

SPHERICAL SPRING MOUNTING

The present invention relates to a spherical spring mounting. One particular application of such a mounting is in standing frames for handicapped persons where it is necessary to support a vertical post on a platform so that the post can be pivoted with respect to the platform against a resilient force in any direction and with an adjustable degree of resilience. Such a standing frame is described in my European Patent application to be published on Nov. 26, 1980 under Publication No. 0019467. The mounting for the post in the aforesaid European Patent application is a complicated structure which relies upon two linear springs composed of discs of elastomeric material. Means are provided for utilising a selected number of such discs, to vary the degree of resilience and the linear springs have to be coupled by a complicated system of crank levers.

The present invention is concerned with providing a more economical form of resilient mounting structure which is at least equal in performance.

The spherical spring mounting of the invention may be used in other applications requiring freedom of motion in any direction normal to an axis and adjustable resilience.

According to the invention there is provided a spherical spring mounting comprising:

a hub having mounting means for a member to be mounted to extend along the hub axis, the hub having a portion of part-spherical external surface, an array of layers of elastomer surrounding the spherical hub portion, each elastomer layer having the form of a hollow truncated sphere, the elastomer layers being separated by hollow truncated spherical shells of rigid material, a casing having a truncated spherical inner surface surrounding the outermost elastomer layer, the elastomer layers and shells being bonded together and to the hub and casing, more than two bores each extending radially through the casing, the bonded layers and shells, and into the spherical hub portion, the bores being arranged symmetrically about the axis, a group of connecting members of different lengths, there being a number of members of the same length equal to the number of bores and a number of different lengths equal to the number of elastomer layers, the connecting members being each adapted for insertion into a bore to connect the hub to a selected shell corresponding to the length of the connecting member whereby with all the bores fitted to one selected shell a selected degree of resilience can be imparted to a mounted member when pivoted in any direction normal to the axis, each connecting member being provided with means for engagement with the hub and means to allow its withdrawal.

The preferred elastomer is rubber and the different layers may be of different hardness and different surface area and volume. The shells are preferably of steel and may be made of spun steel.

The connecting members may be snap engaged into the bore in the hub, e.g. by means of an annular groove and clip ring formed in the hub bore, each connecting member being formed with an annular groove for snap engagement with the clip ring.

The connecting members may be tubular and may be provided with internal means for engaging a withdrawing tool.

Three or more symmetrically arranged bores may be provided around the axis but it is preferred to use four bores arranged 90° apart.

An embodiment as hereafter described with reference to the accompanying drawings in which:

FIG. 1 is a side elevational view of a spherical spring mounting in accordance with the invention, FIG. 2 is a plan view of the embodiment of FIG. 1, FIG. 3 is a vertical cross-sectional view corresponding to FIG. 1 of the embodiment of FIG. 1, and FIGS. 4a, 4b and 4c are respectively side elevational views, end views and axial cross-sectional views of connecting pins.

In the drawings the spherical spring mounting comprises a central hub 1 having mounting means which includes a cylindrical bore 2 which extends through a cylindrical portion 3 and a part-spherical portion 4 i.e. having an external surface 5 in the form of a truncated sphere. Grub screws 6 are provided in the cylindrical portions 3 for holding a post mounted in place in the bore 2.

Surrounding the spherical hub portion 4 is an array of layers 7, 8, 9 and 10 of elastomer. Each elastomer layer is of uniform thickness and has the form of a hollow truncated sphere. The inner layer 7 conforms to the external surface 5 of the hub portion 4 and is bonded thereto. A first rigid shell 11, of spun steel and also of uniform thickness and truncated spherical shape has a concave surface conforming to the outer surface of elastomer layer 7 and is bonded thereto and its outer surface is in turn bonded to the elastomer layer 8. Likewise shells 12 and 13 respectively surround elastomer layers 8 and 9 and are bonded thereto. The outer layer 10 of elastomer is surrounded by a casing 14 the inner surface of which is of hollow truncated spherical shape and conforms to the outside surface of elastomer layer 10 and is bonded thereto. As shown in FIG. 3 the casing 14 has a part-spherical portion which conforms with the shells and it may also be made of spun steel. It contains a cylindrical lower portion 15 which is bolted to a base frame 16 by means of bolts 17. However the casing 14 can have an external surface of any desired shape and it need not be of uniform section.

As shown more particularly in FIG. 3, four bores are formed so as to extend radially through the casing 14, the bonded elastomer layer and shells and into the spherical hub. As shown the bores extend right through the hub but this is not strictly necessary. In FIG. 2 the entrances to the four bores are visible, the bores being numbered 18, 19, 20 and 21, bores 18, 19 and 20 being visible in FIG. 3. Within the hub portion 4 each bore is formed with an annular groove 22 and within each such groove is located a resilient clip ring 23.

Associated with the structure already described is a group of connecting pins used for the purpose of connecting the hub 4 with a different selected shell 11, 12, 13 or the casing 14.

To obtain the minimum degree of stiffness (maximum degree of elasticity) none of the pins shown in FIGS. 4a, 4b, 4c are used. In this case all of the elastomer layers 7, 8, 9 and 10 contribute to the elasticity of the spring when a member mounted in the bore 2 is pivoted in any direction. To obtain a first increase in stiffness, four pins 24 as shown in FIGS. 4a, 4b, 4c are used.

The pins 24 are hollow cylindrical members having an external diameter adapted to be a close-fit within the bores 18, 19, 20, 21. The external surface is formed with an annular groove 25 adapted to snap engage with one of the clip rings 23 when the pin is pushed into one of the bores 18 to 21. The pins 24 are of such a length that when engaged with the hub they extend rearwardly sufficiently to engage with the shell 11 but not substantially beyond it into elastomer layer 8. When four pins 24 are in position the hub is rigid with the shell 11 so that only the elastomer layers 8, 9 and 10 are used for their spring qualities.

When a further degree of stiffness is required the pins 24 are removed and replaced by pins 26 which are also provided with grooves 25 for the same purpose. The pins 26 extend rearwardly to connect with shell 12 so that only elastomer layers 9 and 10 are in use.

To obtain a yet further degree of stiffness the pins 27 are used. These are also provided with grooves 25 and when in position extend rearwardly as far as shell 13, so that only elastomer layer 10 is in use. This provides the maximum degree of stiffness while retaining some resilience.

In order to lock the mounting completely against pivotal motion the pins 28 are used. These are also provided with grooves 25 and when in position extend to connect the hub with the casing 14 which effectively locks the mounting.

Each of the pins 24, 26, 27, 28 is formed with an internal annular groove 29 which is adapted to connect with a withdrawing tool such as a pip pin which can be inserted through the internal bore in each pin and expanded so to engage with the groove after which it is withdrawn to disengage the pin from the clip ring 23.

Turning back to FIG. 3 it will be observed that the elastomer layers are not all of the same surface area or thickness. If desired they may be formed of uniform thickness throughout and so as to extend from the hub in a continuous frusto-conical surface at the top and bottom. However the particular shapes and dimensions illustrated in FIG. 3 are designed to provide a generally equal transition in stiffness with each associated pin. In FIG. 3 the elastomer layers 7 and 8 lie upon the same frusto-cone and the layers 9 and 10 lie upon the same frusto-cone. However the thickness of the layers in order is 9, 7, 10, 8. The arrangement provides the generally smooth transitions within a convenient vertical depth. Clearly an equivalent smooth transition could be obtained by using other combinations of thickness and volume, or it may be desired to vary the degree of stiffness non-linearly, in which case other combinations will be useful.

The hub may be of cast iron or machined steel. Any suitable type of rubber-to-metal adhesive may be used in bonding the elastomer layers. In the embodiment illustrated, if it is desired to vary the degree of resilience in two different planes then different length pins may be used for two diametric pairs of bores.

In one Example, the inside diameter of the casing 14 was 130 mm; the hardness of the rubber was 75 IRHD. When the spring was at its softest (i.e. with no pins inserted) a moment of 170 KNmm gave a deflection of 12°.

I claim:

1. A spherical spring mounting comprising:

a hub having mounting means for a member to be mounted to extend along the hub axis, the hub having a portion of part-spherical external surface, an array of layers of elastomer surrounding the spherical hub portions, each elastomer layer having the form of a hollow truncated sphere, the elastomer layers being separated by hollow truncated spherical shells of rigid material, a casing having a truncated spherical inner surface surrounding the outermost elastomer layer, the elastomer layer and shells being bonded together and to the hub and casing, more than two bores each extending radially through the casing, the bonded layers and shells, and into the spherical hub portion, the bores being arranged symmetrically about the axis, a group of connecting members of different lengths, there being a number of members of the same length equal to the number of bores and a number of different lengths equal to the number of elastomer layers, the connecting members being each adapted for insertion into a bore to connect the hub to a selected shell corresponding to the length of the connecting member whereby with all the bores filled to one selected shell a selected degree of resilience can be imparted to a mounted member when pivoted in any direction normal to the axis, each connecting member being provided with means for engagement with the hub and means to allow its withdrawal.

2. A mounting according to claim 1 wherein the elastomer is rubber.

3. A mounting according to claim 1 or claim 2 wherein the shells are of spun steel.

4. A mounting according to claim 1 or claim 2 wherein each bore is formed within the hub with an annular groove and clip ring and each connecting member is formed with an annular groove for snap-engaging the clip ring.

5. A mounting according to claim 1 or claim 2 wherein each connecting member is tubular and comprises internal means for engaging a withdrawing tool.

6. A mounting according to claim 1 or claim 2 wherein there are four bores arranged 90° apart around the axis.

7. A mounting according to claim 1 or claim 2 wherein the mounting means includes an axial bore to receive a shaft and means to secure a shaft in position in the bore.

* * * * *